J. A. MULHERIN.
RUBBER HOSE BULB.
APPLICATION FILED NOV. 24, 1913.
1,180,733.
Patented Apr. 25, 1916.
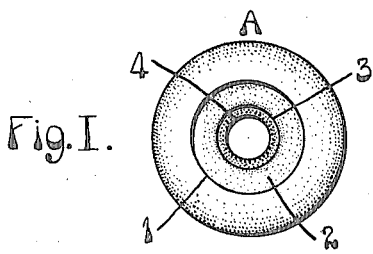
Fig. I.
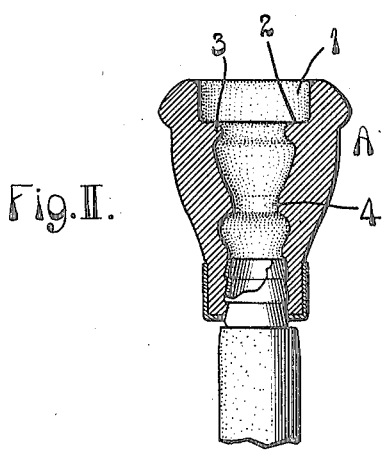
Fig. II.
Attest
Inventor:
J. A. Mulherin

UNITED STATES PATENT OFFICE.

JAMES A. MULHERIN, OF ST. LOUIS, MISSOURI.

RUBBER HOSE-BULB.

1,180,733. Specification of Letters Patent. Patented Apr. 25, 1916.

Application filed November 24, 1913. Serial No. 802,663.

*To all whom it may concern:*

Be it known that I, JAMES A. MULHERIN, a citizen of the United States of America, and a resident of the city of St. Louis, in the State of Missouri, have invented certain new and useful Improvements in Rubber Hose-Bulbs, of which the following is a full, clear, and exact description, reference being had to the accompanying drawings, forming a part of this specification.

My invention relates to a bulb for use upon the hose or tubing of bath spraying or flushing devices, and the like, whereby a connection of such hose or tubes to faucets or pipes is provided for.

Heretofore, so far as I am aware, rubber bulbs of the kind to which my invention pertains have been so made as to be applicable only to certain sized faucets, which single contracted portions of the bulbs are suitable to fit, and the bulbs are therefore, not applicable universally to all sized faucets.

My invention has for its object to provide a hose or tubing bulb which may be applied to faucets of various sizes and kinds.

Figure I is a top view of my bulb. Fig. II is a longitudinal section of a bulb applied to the stepped nozzle of a rubber hose.

The tubular rubber bulb A made in accordance with my invention may be, except at its top, of any desired external configuration similar, for example, to the configuration of rubber hose bulbs heretofore made. In the top end of the bulb is a cylindrical pocket 1, the wall of which is parallel with a line extending longitudinally through the center of the bulb. At the bottom of said pocket is an annular shoulder 2, which extends at approximately a right angle from the wall of the pocket. Immediately beneath the pocket 1 is an inwardly extending annular rib 3, which is concentric with the wall of the pocket 1, but is of less diameter than said pocket. Beneath the annular rib 3 is an inwardly converging outer chamber leading to a contracted neck or annular rib 4, which is concentric with the wall of the pocket 1 and the annular rib 3, and is of less diameter than the annular rib 3. Beneath the inner rib 4 is a globular inner chamber and cylindrical neck opening which receives the stepped nozzle of the rubber hose.

It will be understood that the bulb contains a longitudinal passageway, which is contracted in varying degrees at the internal annular ribs 3 and 4 relative to the diameter of the passageway at the top pocket 1, and it will be readily perceived that the bulb may be fitted to various sized spouts of faucets by properly applying the bulb so that the faucet spout will be gripped by the elastic bulb when the spout is seated in the pocket 1, the annular rib 3 or the annular rib 4, according to whichever of these elements the size of the faucet spout most closely approximates.

The pocket 1 is made cylindrical in order that it will receive a faucet having a screw threaded spout, the threads of which enter into the rubber adjacent to the pocket wall, and the ribs 3 and 4 are so formed as to be flexible as well as elastic, thereby permitting of the distortion of such ribs for the purpose of enabling them to secure a more perfect grip upon the spouts or faucets seated within the ribs.

I claim:—

A hose bulb for spraying or flushing devices formed of flexible material constructed with an outer cylindrical pocket having an annular shoulder at the bottom thereof, an annular inner rib beneath the annular shoulder, providing a contracted opening, a second annular inner rib, an inwardly converging chamber between the two ribs, a cylindrical neck opening at the inner end of the bulb and a globular chamber between the second inner annular rib and the neck opening.

JAMES A. MULHERIN.

In the presence of—
E. B. LINN,
E. K. CLARK.